United States Patent
Wicker et al.

(10) Patent No.: US 6,218,467 B1
(45) Date of Patent: Apr. 17, 2001

(54) (METHYL) METHACRYLATE MALEIC ACID ANHYDRIDE COPOLYMERS AS POLYMER MODIFYING AGENTS FOR PLASTICS AND MIXTURES AND POLYMER COMPOSITES PRODUCED THEREWITH

(75) Inventors: Michael Wicker, Seeheim-Jugenheim; Uwe Numrich, Weiterstadt; Michael May, Griesheim; Hermann Jaksch, Ober-Ramstadt; Mona Rueppel, Hoechst, all of (DE)

(73) Assignee: Roehm GmbH, Darmstadt (DE)

( * ) Notice: Subject to any disclaimer, the term of this patent is extended or adjusted under 35 U.S.C. 154(b) by 0 days.

(21) Appl. No.: 09/319,938

(22) PCT Filed: Nov. 26, 1997

(86) PCT No.: PCT/EP97/06586

§ 371 Date: Aug. 16, 1999

§ 102(e) Date: Aug. 16, 1999

(87) PCT Pub. No.: WO98/27157

PCT Pub. Date: Jun. 25, 1998

(30) Foreign Application Priority Data

Dec. 18, 1996 (DE) .............................. 196 52 758

(51) Int. Cl.[7] .............................. C08L 77/00; C08L 33/10
(52) U.S. Cl. .............................. 525/66; 525/64; 525/166; 525/176; 525/179; 525/183
(58) Field of Search .............................. 525/64, 66, 166, 525/176, 179, 183

(56) References Cited

U.S. PATENT DOCUMENTS 5,162,416 * 11/1992 Udipi .

FOREIGN PATENT DOCUMENTS

| 0321878 A2 | 6/1989 | (EP) . |
| 0733671 | 9/1996 | (EP) . |
| 152553 * | 8/1985 | (JP) . |

OTHER PUBLICATIONS

MISRA "Structure and Properties of Compatibilized Blends of Polyamide and ABS" Journal of Appl. Polym. Sci. 50(7) Nov. 15, 1993 p. 1179–1186.*

Derwent Accession, Woche 8820, London: Derwent Publications Ltd., AN 88–136401 (20), Klasse C08J; (Mitsui Du Pont Polychemical), abstract.

Guegan, P., et al., Kinetics of Chain Coupling at Melt Interfaces. Macromolecules, Aug. 1994. bande 27, No. 18, pp. 4996–4997.

* cited by examiner

Primary Examiner—David J. Buttner
(74) Attorney, Agent, or Firm—Oblon, Spivak, McClelland, Maier & Neustadt, P.C.

(57) ABSTRACT

The invention concerns a mixture or polymer composite of a copolymer (CP) comprising between 70 and 99.9 wt % methylmethacrylate, between 0.1 and 5 wt % maleic acid anhydride and between 0 and 25 wt % further vinylically copolymerizable monomers which, apart from the vinyl function, have no further function groups, with a polymethacrylate-compatible plastics (VK) and a polymer (PN) which contains at least one terminal nucleophilic groups.

10 Claims, No Drawings

(METHYL) METHACRYLATE MALEIC ACID ANHYDRIDE COPOLYMERS AS POLYMER MODIFYING AGENTS FOR PLASTICS AND MIXTURES AND POLYMER COMPOSITES PRODUCED THEREWITH

SPECIFICATION

State of the art

With few exceptions, such as polymethyl methacrylate and acrylonitrile/butadiene/styrene copolymer (ABS), polymethyl methacrylate and PVC or polystyrene (PS), and poly (2,6-dimethyl-1,4-phenylene oxide), different plastics are incompatible with one another and cannot be mixed with one another for energetic reasons [see T. K. Kwei, H. L. Frisch, Macromolecules, 11, 1267 (1978)]. Homogeneous mixtures of different plastics on the molecular level are instead the exception. It is technically difficult to prepare a mixture or an alloy or a composite or a blend of polymers incompatible with one another, and this usually leads to materials with poorer practical properties than the individual components (separation of the blend, delamination of the composite) because of phase separation. However, it often seems technically desirable to be able to combine with one another the good material characteristics of different plastics. Thus, for example, polyamides (PA) are distinguished by their excellent chemical resistance, their flow properties in processing, and their heat distortion resistance; on the other hand, they are deficient in dimensional stability.

U.S. Pat. No. 4,946,918 (Nippon Oil and Fats Co.) describes compatibilizers for mixtures of synthetic resins, for example different types of polyamide, polycarbonate/ABS varieties, and polycarbonate/poly(butylene terephthalate) varieties. These compatibilizers are copolymers of maleic anhydride, maleic acid, or maleic acid salts with polyoxyalkylenes.

EP-A 113 105 describes a method for preparing heat distortion-resistant molding compositions, with a mixture of a copolymer (I) consisting of methyl methacrylate, vinylaromatic, and maleic anhydride, and a copolymer (II) consisting of methyl methacrylate and optionally other comonomers being produced.

DE-A 44 40 219 describes a method for preparing copolymers of alkyl methacrylate, vinylaromatics, and maleic anhydride. The polymerization can take place at low temperatures in the range, for example, of 50 to 60° C. in a polymerization vessel. The block polymer can then be taken out, ground, and subjected to degassing extrusion followed by granulation.

Acrylonitrile/butadiene/styrene copolymers (ABS), for example, show very good impact strength and notched impact strength even at low temperatures, good strength and dimensional stability, but with only poor chemical resistance and inadequate flowability and heat distortion resistance.

It is known from studies described in the literature [M. Stolp, H.-J. Radusch; Kunstsoffe 85, 4, (1995)] that the two materials ABS and PA are incompatible with one another and even the admixing of only small fractions of polyamide with acrylonitrile/butadiene/styrene copolymers leads to distinct embrittlement of the ABS. This embrittlement of plastic parts also hinders recycling, among other problems.

The purpose of this invention therefore consists of finding a way to be able to prepare certain polymer blends or composites from plastics incompatible with one another, at least retaining the positive material properties of the individual component.

Specifically in question are blends of polymethacrylate-compatible plastics (PC), for example polymethyl methacrylate (PMMA), acrylonitrile/butadiene/styrene copolymers (ABS), or polyvinylidene fluoride (PVDF), with polymers (PN) that contain at least one terminal nucleophilic group (such as an amino or hydroxy group, for example). Polyamides (PA) and polyesters may be mentioned here as examples of the polymers (PN).

Preferred are polyamides (PA) such as PA3, PA4, PA5, PA6, PA7, PA8, PA9, PA10, PA11, PA12, for example, that are prepared by polycondensation of ω-amino acids or by polymerization of the corresponding lactams. Polyesters that may be mentioned in particular are polyethylene terephthalate and polybutylene terephthalate.

Polyamides are preferred, especially PA6, PA6,6, PA6,10, PA10, PA11, PA12, with the "double-numbered" polyamides (PA6,6, PA6,10) being prepared by reaction of α,ω-diamines with α,ω-dicarboxylic acids (in this regard, for example, see Elias, H. G. (1981) Makromolekule: Structure, Properties, Syntheses, Substances, Technologies; 4th completely revised and substantially expanded edition, Huthig and Wepf Verlag; Chapter 28.2 "Polyamides", pp. 796 ff).

It has been found that the problem is solved surprisingly by the use of a polymeric modifier (CP) consisting of the monomeric components methyl methacrylate (MMA), maleic anhydride (MA), and optionally other radical-polymerizable comonomers containing no other functional groups.

The other comonomers are not critical for the feasibility of the invention, if they have no functional groups, e.g. acid or hydroxy groups, other than the functional vinyl group entering into radical polymerization. Examples of suitable comonomers are esters of methacrylic acid (e.g. ethyl methacrylate, butyl methacrylate, hexyl methacrylate, cyclohexyl methacrylate), esters of acrylic acid (e.g. methyl acrylate, ethyl acrylate, butyl acrylate, hexyl acrylate, cyclohexyl acrylate) or styrene and styrene derivatives, for example such as a-methylstyrene or p-methylstyrene. Reactive bonding leads to modification of the polymer (PN) that contains at least one terminal nucleophilic group, and thus to a distinct improvement of the property profile of the aforementioned polymer mixtures or polymer composites. The modification can take place, for example, by melting mixed granulates of the copolymer (CP) and of the polymer (PN).

The term "mixtures and polymer composites" used below therefore designates the physical and optionally chemical union of the copolymer pursuant to the invention with the polymers (PN) to be modified and/or the polymethacrylate-compatible plastics (PC).

Instead of maleic anhydride, in principle another copolymerizable acid or a copolymerizable anhydride can also be used, for example such as maleic acid, itaconic acid, itaconic anhydride, fumaric acid, or glutaric anhydride. However, maleic anhydride is especially preferred.

The invention relates to mixtures or polymer composites of the copolymer (CP) consisting of 70–99.9 wt. % methyl methacrylate, 0.1–5 wt. % maleic anhydride, and 0–25 wt. % of other vinyl-copolymerizable monomers that have no functional groups other than the vinyl function with a polymethacrylate-compatible plastic (PC) and a polymer (PN) that contains at least one terminal nucleophilic group.

Copolymers of MMA and MA are known from the literature. Thus, a method is described in German Unexamined Patent Application DE 2,724,360 (BAYER AG) for preparing low-residual-monomer molding compositions; among the examples is also found a cyclohexyl methacrylate/MMA/MA terpolymer. Polymerization in this case occurs with an internal reactor temperature of 140° C. up to 40% conversion; the polymer syrup is then concentrated in a special degassing device and is degassed in another unit process to a residual monomer content of <0.1% in a screw machine.

Copolymers of 67–99 wt. % MMA with 1–33 wt. % MA are claimed in Jpn. Kokai Tokkyo Koho JP 60,141,708 (C.A. 104:6583e). Polymerization in this case occurs at 160° C. to 62% conversion. The syrup is then heated to 200° C. and then degassed at 230° C. in an extruder.

Both of the methods described are technically complicated and economically unattractive, and also have the drawback that large amounts of unreacted monomers have to be removed from the product by various degassing devices. The use of the products thus obtained as polymeric modifiers for incompatible polymer mixtures or composites is not mentioned.

The copolymers (CP) pursuant to the invention consist of:
70–99.9 wt. % methyl methacrylate,
0.1–5 wt. % maleic anhydride, and
0–25 wt. % of other methacrylate esters, acrylate esters, or styrene derivatives that contain no other functional groups.

They are prepared by bulk polymerization of the monomers with the addition of radical initiators and molecular weight regulators at temperatures <80° C. to conversions >95%, preferably >98%.

The polymerization is initiated in a known way by radical-forming polymerization initiators, but can also be carried out purely thermally at a lower rate of polymerization. A single addition of the polymerization initiator before beginning the polymerization is usually sufficient, with the polymerization initiator being chosen so that sufficient radical formation occurs under the polymerization conditions up to the completion of polymerization.

As examples of polymerization initiators may be mentioned: azo compounds such as 2,2'-azobis(isobutyronitrile) or 2,2'-azobis(2,4-dimethylvaleronitrile), redox systems such as the combination of tertiary amines with peroxides, or preferably peroxides (in this regard, for example, cf. H. Rauch-Puntigam, Th. Völker, "Acrylic and Methacrylic Compounds", Springer, Heidelberg, 1967, or Kirk-Othmer, Encyclopedia of Chemical Technology, Vol. 1, pages 386 ff, J. Wiley, New York, 1978). Examples of suitable peroxide polymerization initiators are dilauroyl peroxide, tert-butyl peroctoate, tert-butyl perisononanoate, dicyclohexyl peroxydicarbonate, dibenzoyl peroxide, or 2,2-bis(tert-butylperoxy)butane. The polymerization can also preferably be carried out with a mixture of different polymerization initiators with different half-lives, for example dilauroyl peroxide and 2,2-bis (tert-butylperoxy)butane, in order to keep the radical flow constant during the polymerization and at different polymerization temperatures. The amounts of polymerization initiator used are usually 0.01 to 2 wt. % based on the mixture of monomers.

The molecular weights of the copolymers (CP) are adjusted by polymerizing the monomer mixture in the presence of molecular weight regulators, especially such as the mercaptans known for this purpose, for example n-butyl mercaptan, n-dodecyl mercaptan, 2-mercaptoethanol, or 2-ethylhexyl thioglycolate, with the molecular weight regulator generally being used in amounts of 0.05 to 5 wt. % based on the mixed monomers, preferably in amounts of 0.1 to 2 wt. %, and with particular preference in amounts of 0.2 to 1 wt. % based on the mixed monomers (for example see H. Rauch-Puntigam, Th. Volker, "Acrylic and Methacrylic Compounds", Springer, Heidelberg, 1967; Houben-Weyl, Methoden der organischen Chemie, Vol. XIV/1, page 66, Georg Thieme, Heidelberg, 1961, or Kirk-Othmer, Encyclopedia of Chemical Technology, Vol. 1, pages 296 ff, J. Wiley, New York, 1978). It is preferred to use n-dodecyl mercaptan as molecular weight regulator.

The average molecular weights Mw of the copolymers (CP) adjusted in this way are generally between $10^4$ and $5 \times 10^5$ daltons, preferably between $3 \times 10^4$ and $2.5 \times 10^5$ daltons, corresponding to reduced viscosities $\eta_{spec}/c$, measured according to ISO 1628-6 in chloroform, of 10 to 150 ml/g, preferably from 15 to 100 ml/lg, based on polymethyl methacrylate as calibration standard (for determination of the average molecular weights $M_w$, for example, cf. H. F. Mark et al., Encyclopedia of Chemical Science and Technology, Vol. 10, pages 1 to 19, J. Wiley, New York, 1978).

The monomer mixtures can contain other additives besides the polymerization initiators and molecular weight regulators, for example such as UV absorbers, antioxidants, dyes or pigments, and mold-release aids in fractions of up to 10 wt. % based on the monomers used. The copolymers (CP) are preferably prepared by bulk polymerization, and with special preference in suitable polymerization vessels of the usual design. In general, the polymerization vessels are temperature-controlled in a water bath at temperatures between 20 and 80° C. during the polymerization in order to maintain a uniform radical flow from the decomposition of the polymerization initiator.

After completion of polymerization, which is carried out to monomer conversions of at least 95%, preferably at least 98%, the copolymers (CP) are removed from the polymerization vessel as a block.

After tempering at temperatures in the range of 100° C. to 140° C., the polymers are crushed mechanically, degassed in an extruder (in part with a vacuum applied), and then granulated. The degassing step is carried out to arrive at residual monomer contents below 1 wt. % and especially below 0.5 wt. %.

The copolymerization of the monomers is distinctly affected by the lower polymerization temperature and the higher conversion, so that the methacrylate/MA copolymers (CP) pursuant to the invention differ substantially in architecture from the copolymers of JP 60,141,708 or DE 2,724,360 prepared at higher temperature. Conversion and polymerization temperature determine the probability of addition of the individual monomers to the growing polymer chain, and thus also the sequence length distribution in the polymers, especially when the polymerization temperature approaches or even exceeds the ceiling temperature of one of the comonomers (as in JP 60,141,708 in the case of MMA).

This behavior is known in the literature, and is elucidated, for example, by Wittmer using the example of the copolymerization of MMA with a-methylstyrene [P. Wittmer, Makromol. Chem. 103, 188 (1967)]. Extended to the case described in this invention, it can be presumed that the smaller the difference between the polymerization temperature and the ceiling temperature of MMA, the smaller also will be the probability that lengthy MMA sequences will develop during polymerization, and the greater will be the probability that the more unreactive comonomer, MA in this case, will add to the growing polymer chain.

The methacrylate/MA copolymers (CP) pursuant to the invention are used according to the invention as polymeric modifiers for polymers (PN) that contain at least one terminal nucleophilic group. Furthermore, the methacrylate/MA copolymers (CP) pursuant to the invention are also used according to the invention as polymeric modifiers for incompatible polymer mixtures or composites, consisting of PMMA-compatible plastics (PC) and polymers (PN) that contain at least one terminal nucleophilic group.

The modification usually occurs in the molten state, for which either all of the mixture components can be melted together, or a preblend can first be prepared from the methacrylate/MA copolymer (CP) with one of the components of the polymer blend followed by addition of the other component. The other component can be added, for example, "in-line" after the compounding of the preblend, for example by solids side-infeed into the compounding extruder. The prepared preblend can also be mixed with the other component in a separate compounding process.

The methacrylate/MA copolymer (CP) pursuant to the invention can also be used as an adhesion promoter between the mentioned thermoplastics that are incompatible with one another, for example to prevent the risk of delamination of a multilayered composite. Modification in this case can occur, for example, from multiple-layer extrusion of the components onto one another, with the methacrylate/MA copolymer (CP) pursuant to the invention forming the interlayer between the thermoplastics incompatible with one another described above.

Also possible here is coextrusion of a preblend consisting of the methacrylate/MA copolymer (CP) pursuant to the invention with the PMMA-compatible thermoplastic (PC) or the polymer (PN) that contains at least one terminal nucleophilic group, and the third component.

In the case of plastic composites, furthermore, the recyclability of the composite materials is assured by the polymeric modifiers (CP), inasmuch as the mechanical properties are improved during processing by regranulation.

The efficacy of the methacrylate/MA copolymers in the applications mentioned is presumably attributable to the special architecture of the polymer chains. Characterized by the copolymerization parameters, the MA is only very poorly incorporated in the polymer chain. Thus, lengthy MMA sequences are preferentially formed in the polymer chains at lower polymerization temperatures, which might be responsible for miscibility with PMMA-compatible polymers (PC).

It is known from the literature that mixtures of normally incompatible polymers can be stabilized by graft or block copolymers that can undergo strong interactions with both blend components [P. Guegan et al., Makromolecules 27 (1994) 4993–4997]. Such compatibilizers show behavior similar to soap molecules at a water/oil interface and for this reason they are called "polymer emulsifiers" or "polymer dispersants". When mixing diblock or graft copolymers with the monomer units of the mixture components of the polymer blend to give the multiphase polymer mixtures, these copolymers act as compatibilizers between the polymers, by arranging themselves in the phase interfaces because of their partial solubility in the two polymer phases, lowering the interfacial energy and thus decisively increasing the adhesive force.

Prerequisites for such compatibilization are sufficiently long sequences of the two polymer components in the copolymer and incomplete compatibility of the copolymer with one of the two mixture components, so that the compatibilizing copolymer is also actually concentrated in the phase interface.

If a special process is necessary for preparing these sequence polymers, the process becomes complex and involves high costs. In the case pursuant to the invention described here, however, no special preparation of the sequence polymers is necessary, since the polymer mixing process (compounding) is combined with the preparation of the compatibilizing sequence polymers. This process is a special case of reactive extrusion and is called "reactive compounding" [M. K. Akkapedi, B. Van Buskirk, and J. H. Glans, "Reactive Alloying of Polymers through Addition and Condensation Reactions", International Conference on Advances in High Performance Polymer Alloys (1991)].

As is apparent form the examples described below, reactive bonding of the nucleophilic end groups of the polymer (PN) to the anhydride groups in the methacrylate/MA copolymer (CP) occurs under the blending conditions, so that the methacrylate/MA copolymers can function as compatibilizers. In the case of multilayer extrusion, the graft copolymers are formed at the phase interface and thus bring about efficient composite adhesion.

Methods for characterizing the reactive interaction between the polymers are described below.

1.) Measurement of torque during the polymer mixing process in a batch ram kneader. The graft copolymerization (formation of polymer composites) between reactive components of a polymer mixture leads to an increase of molecular weight, from which results a viscosity increase and consequently an increase of torque of the kneader elements. Dividing the torque of the polymer mixture that contains a compatibilizing modifier by the torque of a polymer mixture in which a polymer that is unreactive but of similar structure otherwise has been used instead of the compatibilizing modifier, leads to the torque increase factor ("TIF"). This torque increase factor characterizes the strength of the reactive interaction between the components of a polymer mixture.

2.) Determination of the mechanical properties of injection-molded specimens.

The quality of interphase bonding can be characterized by determining the mechanical properties of injection-molded specimens, especially the notched impact strength and ultimate elongation.

EXAMPLES

The invention will be described by the following examples.

Example 1

Preparation of the methyl methacrylate/MA copolymer MI.

To a monomer mixture of 7,920 g methyl methacrylate and 80 g maleic anhydride are added 8 g of dilauroyl peroxide and 4 g of 2,2-bis(tert-butylperoxy)butane as polymerization initiator and 32 g of n-dodecyl mercaptan as molecular weight regulator. The resulting mixture is loaded into a polymerization vessel and degassed for 10 min. Polymerization is then carried out in a water bath for 1 hour at 50° C., 21 hours at 45° C., and 7 hours at 50° C. water bath temperature.

After removing the polymerization vessel, the polymer is tempered for 12 hours longer at 120° C. in an exhaust hood.

After cooling, the polymer is crushed mechanically and degassed in a single-screw extruder at temperatures between 220° C. (inlet zone) and 240° C. under vacuum (p=30–40 mbar), and is then granulated.

The resulting single-phase copolymer is clear and colorless. It has a reduced viscosity η sp/c in chloroform according to ISO 1628-6 of 55 ml/g, corresponding to an average molecular weight Mw of about 120,000 daltons (based on a polymethyl methacrylate standard). After the degassing extrusion the product has a residual monomer content of 0.28% MMA and 0.012% MA.

Example 2

Preparation of the methyl methacrylate/MA copolymer M2.

To a monomer mixture of 8,077 g methyl methacrylate and 123 g maleic anhydride are added 2.87 g of dilauroyl peroxide and 0.82 g of 2,2-bis(tert-butylperoxy)butane as polymerization initiator and 32.8 g of n-dodecyl mercaptan as molecular weight regulator.

The resulting mixture is loaded into a polymerization vessel and degassed for 10 min. Polymerization is then carried out in a water bath for 6 hours at 65° C. and 17 hours at 55° C. water bath temperature.

After removing the polymerization vessel, the polymer is tempered for 12 hours longer at 120° C. in an exhaust hood. After cooling, the polymer is crushed mechanically and degassed in a single-screw extruder at temperatures between 220° C.(inlet zone) and 240° C. under vacuum (p=30–40 mbar), and is then granulated.

The resulting single-phase copolymer is clear and colorless. It has a reduced viscosity η sp/c in chloroform according to ISO 1628-6 of 55 ml/lg, corresponding to an average molecular weight Mw of about 120,000 daltons (based on a polymethyl methacrylate standard). After the degassing extrusion the product has a residual monomer content of 0.19% MMA and 0.042% MA.

Example 3

Preparation of the methyl methacrylate/MA copolymer M3.

To a monomer mixture of 7,840 g methyl methacrylate and 160 g maleic anhydride are added 8 g of dilauroyl peroxide and 4 g of 2,2-bis(tert-butylperoxy)butane as polymerization initiator and 32 g of n-dodecyl mercaptan as molecular weight regulator.

The resulting mixture is loaded into a polymerization vessel and degassed for 10 min. Polymerization is then carried out in a water bath for 2.5 hours at 50° C. and 35 hours at 45° C. water bath temperature.

After removing the polymerization vessel, the polymer is tempered for 12 hours longer at 120° C. in an exhaust hood. After cooling, the polymer is crushed mechanically and degassed in a single-screw extruder at temperatures between 220° C. (inlet zone) and 240° C. under vacuum (p=30–40 mbar), and is then granulated.

The resulting single-phase copolymer is clear and colorless. It has a reduced viscosity η sp/c in chloroform according to ISO 1628-6 of 54 ml/g, corresponding to an average molecular weight Mw of about 115,000 daltons (based on a polymethyl methacrylate standard). After the degassing extrusion the product has a residual monomer content of 0.19% MMA and 0.042% MA.

Example 4 (Comparison Example)

Preparation of polymethyl methacrylate V4.

The procedure is the same as in Example 1, except that 8,000 g methyl methacrylate (and no maleic anhydride) is used as the monomer.

The resulting polymer is clear and colorless. It has a reduced viscosity η sp/c in chloroform according to ISO 1628-6 of 55 ml/lg, corresponding to an average molecular weight $M_w$ of about 120,000 daltons (based on a polymethyl methacrylate standard). After the degassing extrusion the product has a residual monomer content of 0.29% MMA.

Example 5

Preparation of the MMA/cyclohexyl methacrylate/MA copolymer M5.

The procedure is the same as in Example 1, except that 6478 g methyl methacrylate, 1640 g cyclohexyl methacrylate, and 82 g maleic anhydride are used as the monomer mixture.

The resulting single-phase copolymer is clear and colorless. It has a reduced viscosity η sp/c in chloroform according to ISO 1628-6 of 52 ml/g, corresponding to an average molecular weight$_w$ of about 110,000 daltons (based on a polymethyl methacrylate standard). After the degassing extrusion the product has a residual monomer content of 0.21% MMA, 0.19% cyclohexyl methacrylate, and 0.028% MA.

Example 6 (Comparison Example)

Preparation of the MMA/cyclohexyl methacrylate copolymer V6.

To a monomer mixture of 6,400 g methyl methacrylate and 1,600 g cyclohexyl methacrylate are added 2.8 g of dilauroyl peroxide and 0.8 g of 2,2-bis(tert-butylperoxy) butane as polymerization initiator and 32 g of n-dodecyl mercaptan as molecular weight regulator.

The resulting mixture is loaded into a polymerization vessel and degassed for 10 min. Polymerization is then carried out in a water bath for 5 hours at 65° C and 17 hours at 55° C. water bath temperature.

After removing the polymerization vessel, the polymer is tempered for 12 hours longer at 120° C. in an exhaust hood. After cooling, the polymer is crushed mechanically and degassed in a single-screw extruder at temperatures between 220° C. (inlet zone) and 240 ° C. under vacuum (p=30–40 mbar), and is then granulated.

The resulting single-phase copolymer is clear and colorless. It has a reduced viscosity η sp/c in chloroform according to ISO 1628-6 of 51 ml/lg, corresponding to an average molecular weight$_w$ of about 105,000 daltons (based on a polymethyl methacrylate standard). After the degassing extrusion the product has a residual monomer content of 0.31% MMA and 0.24% cyclohexyl methacrylate.

Example 7–12

To characterize the reactive interaction of the compatibilizer with the nucleophilically terminated component of the polymer blend, 45 g of "Vestamid X 4887"(Polyamide-12, manufacturer: Hüls AG, viscosity number according to DIN 53727: 180 ml/g, amino to carboxyl end group ratio: 5 to 1) was mixed with 5 g of each of the polymers described in Examples 1–6 in a batch ram kneader ("Brabender" Co., kneading chamber volume: 60 ml) at 230° C. and at a kneader speed of 30 rpm.

The torque was recorded during the kneading process as a function of time. A constant torque level (equilibrium torque "ET") was reached after 6 min of mixing. To calculate each torque increase factor ("TIF"), the "ET" of the molten mixtures from Examples 7–10 or 11–12 was divided by the "ET" of the correlated molten mixture based on the unreactive modifier (Examples 10 and 12). The "TIFs" thus obtained are shown in the following table.

| Example No. | Compatibilizer | Correlation with Examples 1–6 | "TIF" |
|---|---|---|---|
| 7 | PMMA-co-MA 99 - 1 | M1 (from Example 1) | 1.8 |
| 8 | PMMA-co-MA 98.5 - 1.5 | M2 (from Example 2) | 2.4 |
| 9 | PMMA-co-MA 98 - 2 | M3 (from Example 3) | 2.7 |
| 10 (Comparison) | PMMA 100 | V4 (from Example 4) | 1.0 |
| 11 | PMMA-co-CHMA-MA 79 - 20 - 1 | M5 (from Example 5) | 1.8 |
| 12 (Comparison) | PMMA-co-CHMA 80 - 20 | V6 (from Example 6) | 1.0 |

Example 13

To characterize the reactive interaction of the compatibilizer from Example 2 with the likewise nucleophilically-terminated thermoplastic material polybutylene terephthalate ("Vestodur 3000", manufacturer: Huls AG, viscosity number according to DIN 53727: 165 ml/g, carboxy to hydroxy end group ratio: 3 to 2), the "TIF" was calculated by the procedure described in Examples 7–12. The temperature of mixing in this case was 260° C. As a result, a "TIF" (="ET" of the mixture of VESTODUR 3000 with M2 divided by the "ET" of the mixture of VESTODUR 3000 with V4) of 3.5 was obtained.

Examples No. 14–18

Polyamide-6 (Ultramid, "BASF" Co.) and ABS (acrylonitrile/butadiene/styrene copolymer: "Ronfalin FZ 336", "DSM" Co.) were compounded with various fractions of compatibilizer M5 from Example 5 in a 35-mm diameter "Storck" single-screw extruder at 240° C. The fraction of the ABS component was kept constant in the series of tests.

The "Melt Flow Rate" ("MFR") of the compounds obtained was determined at 240° C. and with an imposed weight of 5 kg to characterize flowability.

For characterization by the notched impact strength ("NIS") ("Izod", ISO 180 1A) and the ultimate elongation, test specimens with dimensions of 80×10×4 mm were prepared on a "Battenfeld 350-CD" screw injection molding machine with a cylinder temperature of 245° C. and a die temperature of 50° C. The cycle time was 44 sec. The results obtained are shown in the following table.

| Example No. | Blend composition PA/ABS/M5 | Izod NIS 23° C. [kJ/m$^2$] | Izod NIS −10° C. [kJ/m$^2$] | Ultimate elongation [%] | MFR (240/5) [g/10 min] |
|---|---|---|---|---|---|
| 14 | 60/40/0 | 5.4 | 4.2 | 81 | 21.0 |
| 15 | 58/40/2 | 10.1 | 7.9 | 200 | 22.2 |
| 16 | 55/40/5 | 14.1 | 10.0 | 200 | 15.9 |
| 17 | 50/40/10 | 13.2 | 9.6 | 200 | 15.6 |
| 18 | 45/40/15 | 12.9 | 9.1 | 125 | 12.3 |

It is clear from the results of examples 14–18 that an optimum in the mechanical properties of the compound is reached by the addition of 5–10 wt. % of the compatibilizer m5.

The concentration range of 5–10 wt. % of compatibilizer is especially preferred for the basic PA/ABS mixture.

What is claimed is:

1. A mixture or polymer composite, comprising:

a copolymer of 70–99.9 wt. % methyl methacrylate, 0.1–5 wt. % maleic anhydride, and 0–25 wt. % of other vinyl-copolymerizable monomers that have no functional groups other than the vinyl function;

a polymethacrylate-compatible plastic; and a polymer containing at least one terminal nucleophilic group;

wherein said polymethacrylate-compatible plastic is a polymethyl methacrylate, an acrylonitrile/butadiene/styrene copolymer, or a polyvinylidene fluoride.

2. The mixture or polymer composite according to claim 1, wherein said polymer containing at least one terminal nucleophilic group is a polyamide.

3. The mixture or polymer composite according to claim 1, wherein said copolymer has an average molecular weight $M_w$ of between $10^4$ and $5\times10^5$ daltons.

4. The mixture or polymer composite according to claim 1, wherein said copolymer has an average molecular weight $M_w$ of between $3\times10^4$ and $2.5\times10^5$ daltons.

5. The mixture or polymer composite according to claim 1, wherein said copolymer has a reduced viscosity of 10–150 ml/g.

6. The mixture or polymer composite according to claim 1, wherein said copolymer has a reduced viscosity of 15–100 ml/g.

7. A method for preparing said mixture or a polymer composite of claim 1, comprising:

melting said copolymer, said polymethacrylate-compatible plastic and said polymer containing at least one terminal nucleophilic group.

8. A method for preparing said mixture or a polymer composite of claim 1, comprising:

blending said copolymer with one component selected from said polymethacrylate-compatible plastic and said polymer containing at least one terminal nucleophilic group;

adding of a remaining component selected from said polymethacrylate-compatible plastic and said polymer containing at least one terminal nucleophilic group.

9. The method according to claim 8, wherein said adding occurs by solids side-infeed into a compounding extruder.

10. A molding prepared from said mixture or polymer composite according to claim 1.

* * * * *